Oct. 10, 1967 E. G. CROMER, JR 3,346,857

PLURAL TONE AUDIBLE INDICATING APPARATUS
HAVING VARIABLE TIME RATIO OF TONES

Filed July 19, 1965

INVENTOR
EARLE G. CROMER, JR.

BY
Dair Freeman & Molinare
Attys.

3,346,857
Patented Oct. 10, 1967

3,346,857

PLURAL TONE AUDIBLE INDICATING APPARATUS HAVING VARIABLE TIME RATIO OF TONES

Earle G. Cromer, Jr., Mount Prospect, Ill., assignor to Mangood Corporation, a corporation of Illinois Filed July 19, 1965, Ser. No. 473,112
7 Claims. (Cl. 340—328)

ABSTRACT OF THE DISCLOSURE

A monitoring apparatus for audible indications of condition changes provided by an oscillator with two audibly distinct tones alternated at regular intervals by a multivibrator. Sections of the multi-vibrator measure the interval of each tone by means of fixed capacitance and resistance delay circuits which are varied by other fixed resistance adapted to be connected in parallel therein by closing of a respective switch therefor. A control means responsive to changes in the conditions monitored engages and trips the switches in different combinations by movement to positions corresponding to the monitored conditions. Thus, audibly distinct signals for different conditions are provided by different intervals of the respective tones.

Figures 1, 2, 3, 4:
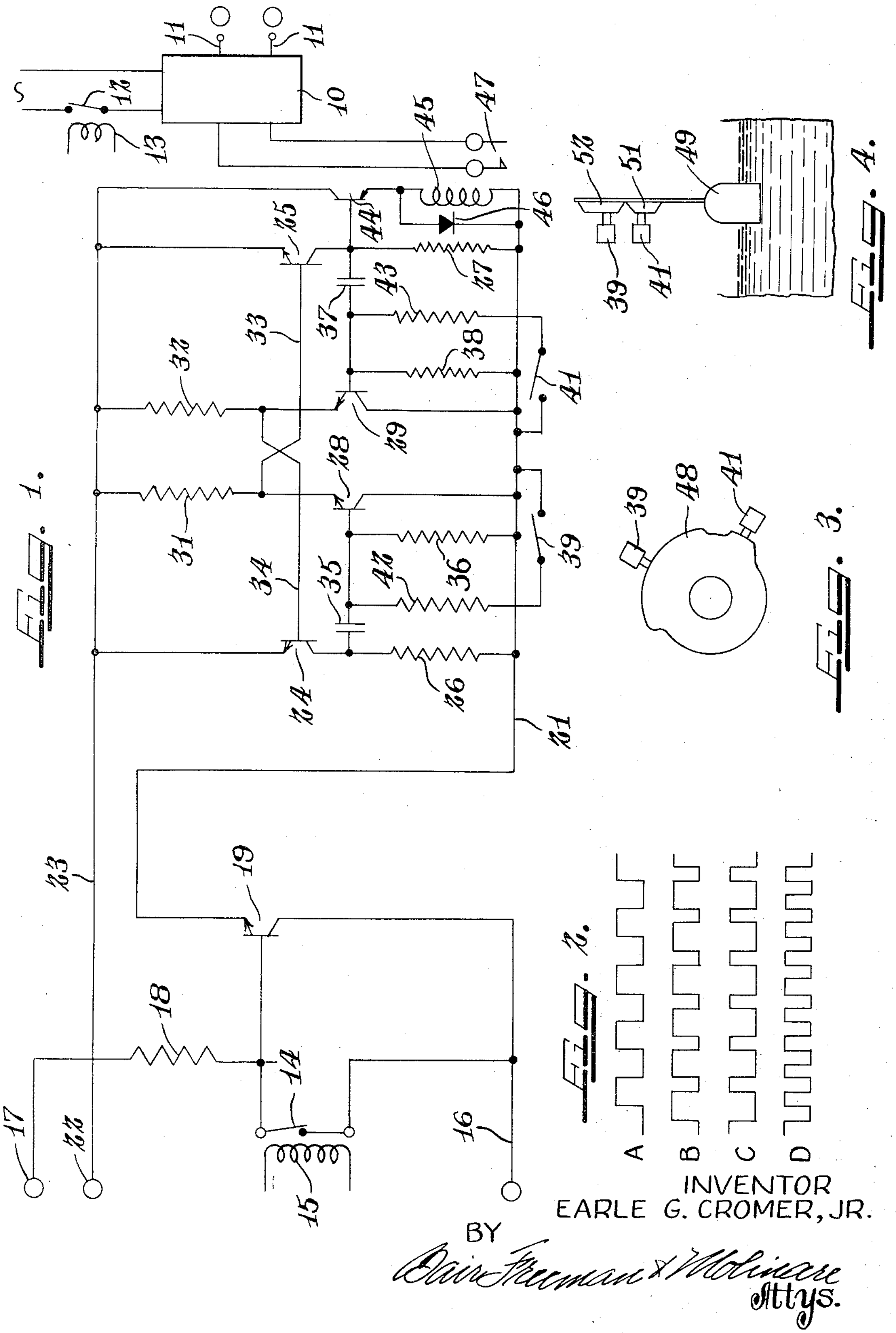

This invention relates to an audible indicating apparatus and more particularly to an apparatus for producing audible signals indicative of a condition or status from a remote point on command.

For collection of information such as the status of various conditions, a so-called "data-phone" system manufactured by Bell Laboratories has come into common use for transmission of digital data. This system comprises an instrument connected into a telephone line and to data collecting apparatus for transmitting in code language, information stored in the data collecting apparatus.

It is one of the objects of the present invention to provide audible indicating apparatus which operates in conjunction with a "data-phone" instrument or similar instrument to provide an audible indication of the status or condition at the location of the instrument through telephone apparatus.

Another object is to provide audible indicating apparatus in which audible signals indicative of different statuses or values of a condition are produced by changes in audible tone signals which are readily distinguishable and easily understandable by normal hearing.

According to a feature of the invention, the instrument may provide a source of tone signals of two or more different audible frequencies with repetitive changes from one tone signal to another being controlled by a free running multivibrator. The periods during which the different tone signals are produced may be changed by control switches or the like, responsive to the status or value of the condition and which change the relative length of the time periods of the multivibrator thereby producing an audible code readily interpreted by ear.

The above and other objects and features of the invention will be more readily apparent from the following description when read in connection with the accompanying drawings in which:

FIGURE 1 is a circuit diagram of an audible indicating apparatus embodying the invention;

FIGURE 2 comprises a series of curves indicating different coded signals;

FIGURE 3 is a partial diagrammatic view of one form of data collecting mechanism; and FIGURE 4 is a diagrammatic view of a second form of data collecting mechanism.

The apparatus, as illustrated, comprises an oscillator 10 capable of producing two or more different frequencies in the audible spectrum and which may be a part of a "data-phone" or similar instrument. The oscillator is provided with output terminals 11 which are connectable to a telephone line through the instrument so that the signals generated by the oscillator will be transmitted over the telephone line and can be interpreted through normal hearing by means of a conventional telephone instrument at a remote point. The oscillator is normally turned off and may be powered by closing a switch 12 which is closed when a relay coil 13 is energized. A similar switch 14 which is normally open is closed when a coil 15 is energized. The coils 13 and 15 are energized through the "data-phone" or similar instrument whenever it receives a signal over the telephone line so that the apparatus will function to provide an audible indication of the status or value of the condition to be measured on command.

The switch 14 controls a connection between a ground line 16 and a source of negative voltage preferably supplied by a battery to a terminal 17. A resistor 18 is provided between the negative voltage source and the switch as shown. A point between the resistor 18 and switch 14 is connected to the base electrode of a transistor 19 which is normally biased to nonconduction, when the switch 14 is open, by the negative voltage impressed on the base through the resistor 18. When the switch 14 is closed, the voltage on the transistor base will become more positive and the transistor will conduct. The collector of the transistor 19 is connected to the ground line 16 and the emitter of the transistor is connected to a line 21 which will be at substantially ground potential when the transistor is conducting.

A second source of negative voltage indicated by the terminal 22 is connected to a line 23 and the audible signal control apparatus of the present invention is powered by the voltage across the lines 21 and 23. This apparatus comprises a free running multivibrator including two gating transistors 24 and 25 whose emitters are connected to the line 23 and whose collectors are connected to the line 21 through resistors 26 and 27. The multivibrator includes a pair of transistors 28 and 29 whose emitters are connected through resistors 31 and 32 to the line 23 and whose collectors are connected directly to the line 21.

A point between the resistor 31 and transistor 28 is connected by a wire 33 to the base of the transistor 25 and, in a similar manner, a point between the resistor 32 and transistor 29 is connected through a wire 34 to the base of the transistor 24. The base of the transistor 28 is connected through a capacitor 35 to a point between transistor 24 and resistor 26 and is also connected through a resistor 36 to the line 21. Similarly, the base of transistor 29 is connected through a capacitor 37 to a point between the transistor 25 and resistor 27, and also through a resistor 38 to the line 21.

The relative periods of oscillation of the multivibrator circuit are controlled by a pair of switches 39 and 41. The switch 39, when closed, connects a resistor 42 in parallel with the resistor 36 and the switch 41, when closed, connects a resistor 43 in parallel with the resistor 38.

The multivibrator circuit as so far described controls a power circuit including a transistor 44 whose collector is connected to the line 23 and whose emitter is connected through a relay coil 45 to the line 21. A rectifier 46 is connected across the coil 45 to discharge stored energy in the coil.

The coil 45, when energized, closes a switch 47 which is connected to the oscillator 10. When the switch 47 is in its normal open position, the oscillator will generate one tone frequency, for example, 1270 cycles per second, while when the switch 47 is closed the oscillator will produce a different frequency, for example, 1070 cycles per second. It will be noted that the relationship of these two frequencies is approximately a minor third musical pitch readily distinguishable by ear.

In operation, when an audible indication of the status or valve of a condition is desired, the operator may dial or otherwise signal the "data-phone" instrument at the location desired. When the incoming call signal is received, the coils 13 and 15 will be energized to close the switches 12 and 14 thereby to cause the apparatus to operate to send back through the telephone system to the calling instrument audible signals indicative of the existing status or value of the condition.

When the switch 12 is closed, the oscillator 10 is powered and commences to oscillate.

Simultaneously, closing of the switch 14 will control the transistor 19 and start operation of the multivibrator circuit. When the transistor 19 starts to conduct a positive voltage will be applied to the transistors 24, 25, 28 and 29. Assuming transistor 28 starts to conduct more rapidly than transistor 29, a positive voltage will appear on line 33 and the base of transistor 25 to turn it on.

The capacitor 37 will gradually charge through transistor 25 and the resistor 38 whose value, together with the value of the capacitor 37, establishes the oscillating time period during which the transistor 29 will remain nonconductive. It will be noted that when the switch 41 is closed, the resistor 43 will be connected in parallel with resistor 38 to reduce this time period. In a typical operation, the time period during which the transistor 29 will remain non-conductive when the switch 41 is opened may be on the order of 600 milliseconds and when the switch 41 is closed on the order of 100 milliseconds. The difference in this time interval is readily perceived by ear, especially in the coded form the audible signals take.

As the capacitor 37 becomes charged, the voltage on the base of transistor 29 becomes more positive and it starts to conduct. At this time, the potential on line 34 will become more positive to bias the transistor 24 into conduction. This will produce a negative voltage through the capacitor 35 on the base of transistor 28 to bias it into non-conduction. When transistor 28 becomes non-conductive, the potential on line 33 will become more negative to bias the transistor 25 into non-conduction. This condition will obtain until the capacitor 35 is charged through transistor 24 and resistor 36 and also through resistor 42 when switch 39 is closed after which the process will again reverse.

When the transistor 25 is conducting, the potential on the base of the transistor 44 will be strongly negative and the transistor 44, which is a pnp type, will conduct. Therefore, current will flow through the coil 45, causing the switch 47 to close. When the transistor 25 is nonconducting, the potential on the base of transistor 44 will become more positive due to its connection through the resistor 27 to the line 21 and it will not conduct. At this time, no current will flow through the coil 45 and the switch 47 will open. When the potential on the base of transistor 44 again becomes negative, it will conduct and current will flow through the coil 45 causing the switch 47 to close. The rectifier 46 by-passes any inductive current from the coil 45 and dissipates stored energy in the coil.

The four graphs A, B, C and D wherein the abscissae represent time and the ordinates represent frequencies indicate four possible signalling conditions. A signal similar to that indicated by graph A will be produced when both switches 39 and 41 are open so that each of the time periods during which transistors 28 and 29, respectively, are conducting will be of maximum length and of equal duration. Therefore, as indicated by the graph, the higher frequency and lower frequency audible signals will alternate and will be of equal length. When one of switches 39 and 41 is closed and the other is open, the condition indicated in the graph B will occur. At this time, the higher frequency signal will be of maximum duration while the lower frequency signal will be of substantially shorter duration, thereby providing an audible code which can easily be heard by ear and which can readily be interpreted.

When the other of switches 39 and 41 is closed and the remaining switch is open, the condition indicated in graph C will occur. At this time, the higher frequency signal is of short duration and the lower frequency signal is of long duration. When both switches are closed, both the higher and lower frequency signals will be of short duration as indicated in the graph D.

With the indicated difference in frequency of the two signals and with the duration of the respective signals varying, between a maximum period of approximately 600 milliseconds and a minimum period of approximately 100 milliseconds, an operator will have no difficulty in understanding and interpreting the transmitted code by ear. He will thus be informed of the existing status or value of the condition detected by sensing apparatus which controls operation of the switches 39 and 41.

FIGURES 3 and 4 illustrate diagrammatically, as examples, two different mechanisms for controlling the switches 39 and 41. As shown in FIGURE 3, these switches are controlled by a rotary cam 48 which may be connected, for example, to the stem of a valve or to any other angularly positionable mechanism to cause different combinations of closing and opening of the switches according to the position of the cam. As shown, the cam is provided with two raised lobes, one of which is longer than the other, and which are spaced a desired distance apart. In the position shown, one of the lobes engages each switch and may either open or close it, depending upon the type of signalling required. As the cam turns clockwise, the switch 41 will be operated either to close or open it while the switch 39 will remain ineffective. As the cam turns further, the switch 41 will be closed by the upper cam lobe at about the same time the switch 39 is released by the upper cam lobe so that the switch operation will be reversed. Continued turning of the cam in a clockwise direction will cause the cam lobes to leave both of the switches so that they will be operated to indicate the extreme position in the other direction from the starting position.

FIGURE 4 illustrates diagrammatically a sensing system for liquid level as, for example, the level in storage tanks of various types or the level of water ways or the like. As shown, a float 49 carries a vertical rod on which two cam projections 51 and 52 are formed. The switches 39 and 41 are mounted adjacent to the rod to be operated by the cam projections. When the liquid level is at a maximum value, as shown, both switches will be operated to produce an indication according to either graph A or graph D of FIGURE 2. As the liquid level falls, the operating plunger for the lower switch 41 will move into the space between the two cam projections to cause the switch 41 either to open or close, while the upper switch 39 remains operated by the cam 52. Upon further reduction in the liquid level, the switch 41 will again be operated by the cam 52 at the same time as the cam 52 moves away from the operating member of switch 39. A still further reduction in liquid level will move cam 52 below the switch 41 so that neither switch 39 or 41 will be operated. It will be understood, of course, that various other types of sensing mechanisms could be provided for the switches 39 and 41.

While one embodiment of the invention has been shown and described in detail, it will be understood that this is illustrative only and is not to be taken as a definition of the scope of the invention, reference being had for this purpose to the appended claims.

What is claimed is:

1. An apparatus for monitoring condition changes by audible indications therefor, comprising in combination oscillator means operable to produce a plurality of audible tone signals, relay means connected to said oscillator means to change the tone signal produced thereby, periodically operating means to operate said relay means in a predetermined timed sequence, and control means adapted to be operated in response to said condition changes to vary said predetermined timed sequence an audibly distinct amount to thereby indicate a condition change.

2. An apparatus for monitoring condition changes by audible indications thereof, comprising in combination: oscillator means for producing frequencies of audibly distinct tones; free running multi-vibrator means controlling said oscillator means to alternate said tones at regular intervals, said multi-vibrator means including a variable circuit to measure an interval for one of said tones; and control means responsive to said condition changes for varying said circuit to change said interval an audibly distinct amount for an audible indication of a change.

3. An apparatus in accordance with claim 1, wherein said circuit has a fixed capacitance and a fixed resistance delaying half-cycle operation of said multi-vibrator means for a period determined by values chosen for each, and also another fixed resistance of desired value and a switch adapted to be connected in parallel into said circuit by the closing of said switch to reduce said period, thereby varying said circuit to change said interval an audibly distinct amount.

4. An apparatus in accordance with claim 2, wherein said control means respond to said condition changes by movement to positions corresponding to various conditions, respectively, said control means engaging, and by said movement, tripping said switch.

5. An apparatus in accordance with claim 4, wherein said control means include a cam with a raised lobe, said cam responding to said condition changes by rotation to positions corresponding to various conditions, respectively, said lobe tripping said switch at one of said positions.

6. An apparatus in accordance with claim 4, wherein said control means include a float responding to changes in liquid level by vertical movement, said float having a projection engaging and tripping said switch by said vertical movement thereof.

7. An apparatus for monitoring condition changes by audible indications thereof, comprising in combination: oscillator means for producing frequencies of two audibly distinct tones; free running multi-vibrator means controlling said oscillator means to alternate said tones at regular intervals, said multi-vibrator means including a pair of variable circuits to measure said intervals for each of said tones, respectively, said circuits having fixed capacitance and fixed resistance delaying half cycle operation of said multi-vibrator means for periods determined by values chosen for each, and also other fixed resistance of desired value and a switch for each of said circuits, respectively, adapted to be connected in parallel into said circuits by the closing of a respective switch to reduce said periods, thereby varying said circuits to change said intervals by audibly distinct amounts; and control means responding to said condition changes by movement to four different positions corresponding to various of said condition changes, respectively, one position with both switches open, a second position with only one switch tripped, a third position with only the other switch tripped, and a fourth position with both switches tripped, to thereby provide four audibly distinct indications for each of said positions and corresponding condition changes.

References Cited

UNITED STATES PATENTS

| | | | |
|---|---|---|---|
| 2,903,648 | 9/1959 | Bonner et al. | 331—47 |
| 2,910,688 | 10/1959 | Kelley et al. | 340—384 |
| 3,188,623 | 6/1965 | Culbertson | 331—113 X |

NEIL C. READ, *Primary Examiner.*

I. LEVIN, H. PITTS, *Assistant Examiners.*